(12) United States Patent
Suhling

(10) Patent No.: US 9,682,454 B2
(45) Date of Patent: Jun. 20, 2017

(54) MICRO-ADJUSTABLE FLIP-AWAY WORK STOP FOR STRUT SYSTEMS

(71) Applicant: Robert James Suhling, Waukegan, IL (US)

(72) Inventor: Robert James Suhling, Waukegan, IL (US)

(*) Notice: Subject to any disclaimer, the term of this patent is extended or adjusted under 35 U.S.C. 154(b) by 0 days.

(21) Appl. No.: 14/257,203

(22) Filed: Apr. 21, 2014

(65) Prior Publication Data

US 2015/0298273 A1  Oct. 22, 2015

(51) Int. Cl.
| | | |
|---|---|---|
| *B25B 5/16* | (2006.01) | |
| *B23Q 16/00* | (2006.01) | |
| *B23Q 16/08* | (2006.01) | |
| *B23Q 16/02* | (2006.01) | |
| *B27B 27/08* | (2006.01) | |

(52) U.S. Cl.
CPC ........ *B23Q 16/001* (2013.01); *B23Q 16/028* (2013.01); *B23Q 16/08* (2013.01); *B27B 27/08* (2013.01)

(58) Field of Classification Search
USPC .......................................................... 269/63
See application file for complete search history.

(56) References Cited

U.S. PATENT DOCUMENTS

| | | | | |
|---|---|---|---|---|
| 1,504,248 A | * | 8/1924 | Johnson ................... | B27B 27/04 83/468.2 |
| 1,823,268 A | * | 9/1931 | Gordon ................ | B23Q 16/001 144/84 |
| 2,435,382 A | * | 2/1948 | Caskey ................... | B27B 27/04 33/32.7 |
| 4,693,158 A | * | 9/1987 | Price ..................... | B23Q 16/001 144/253.1 |
| 4,817,693 A | * | 4/1989 | Schuler ................ | B23D 47/025 144/117.1 |
| 4,887,653 A | * | 12/1989 | Thomas ............... | B23D 47/025 144/1.1 |
| 5,018,562 A | * | 5/1991 | Adams .................... | B27B 27/10 144/253.1 |
| 5,038,486 A | * | 8/1991 | Ducate, Sr. ............. | B27B 25/10 33/430 |
| 5,063,983 A | * | 11/1991 | Barry ..................... | B23Q 3/007 144/135.2 |
| 5,267,818 A | * | 12/1993 | Marantette ............... | B23Q 1/48 144/135.4 |
| 5,716,045 A | * | 2/1998 | Taylor .................... | B23Q 3/007 269/303 |

(Continued)

*Primary Examiner* — Larry E Waggle, Jr.
*Assistant Examiner* — Alvin Grant

(57) ABSTRACT

An in-line indexing mechanism as part of a work-stop system which employs a lead screw to alter the relative distance between a work-stop plate and a swing arm—as well as alignment pins and springs to maintain contact and rigidity between this work-stop plate and swing arm—in order to precisely alter the parameters of a workpiece plane. In particular, the indexing mechanism of the preferred embodiment resides within the extension of an arm, and is located, by default, within the workpiece plane; the act of indexing therefore exerts force upon a workpiece along a coincident axis within said workpiece plane. Additionally, the indexing mechanism may be removed from the workpiece plane, by way of axially rotating the arm, without abandoning the original workpiece parameter and adjustment values.

3 Claims, 8 Drawing Sheets

(56) References Cited

U.S. PATENT DOCUMENTS

| | | | | |
|---|---|---|---|---|
| 5,765,448 A * | 6/1998 | Martelli | B23Q 16/006 | 74/526 |
| 5,768,966 A * | 6/1998 | Duginske | B27B 25/10 | 144/253.1 |
| 5,890,524 A * | 4/1999 | Tucker | B23Q 1/28 | 144/135.2 |
| 5,903,125 A * | 5/1999 | Prentice | B23Q 1/4852 | 318/625 |
| 5,919,014 A * | 7/1999 | Weck | B23Q 1/48 | 408/236 |
| 6,328,510 B1 * | 12/2001 | Hanrath | B23Q 1/4861 | 33/1 M |
| 6,557,601 B1 * | 5/2003 | Taylor | B27B 27/02 | 144/253.1 |
| 6,851,243 B1 * | 2/2005 | Sandford | B26D 7/1818 | 403/252 |
| 6,851,345 B1 * | 2/2005 | Kennelly | B27B 27/02 | 144/253.5 |
| 7,036,540 B2 * | 5/2006 | Welsh | B25H 1/04 | 144/286.1 |
| 7,100,515 B2 * | 9/2006 | Helm | B23Q 1/5481 | 108/143 |
| 7,152,331 B2 * | 12/2006 | Nakamura | G03F 7/70058 | 33/1 M |
| 7,261,502 B2 * | 8/2007 | Pasquetto | B23Q 1/44 | 409/201 |
| 8,033,535 B2 * | 10/2011 | Mannon | B27M 3/12 | 269/291 |
| 8,220,374 B2 * | 7/2012 | Wang | B27B 27/08 | 83/435.15 |
| 8,272,334 B2 * | 9/2012 | Wang | G05G 11/00 | 108/143 |
| 8,342,055 B2 * | 1/2013 | Wang | H01L 21/68 | 108/143 |
| 9,056,402 B2 * | 6/2015 | Clark | B27C 5/04 | |
| 2002/0194971 A1 * | 12/2002 | Park | B23D 47/025 | 83/477.2 |
| 2005/0139056 A1 * | 6/2005 | Gass | B27B 27/02 | 83/438 |
| 2005/0280228 A1 * | 12/2005 | Fernandes | B25H 1/00 | 280/47.35 |
| 2006/0248998 A1 * | 11/2006 | Duginske | B23Q 3/007 | 83/468 |

* cited by examiner

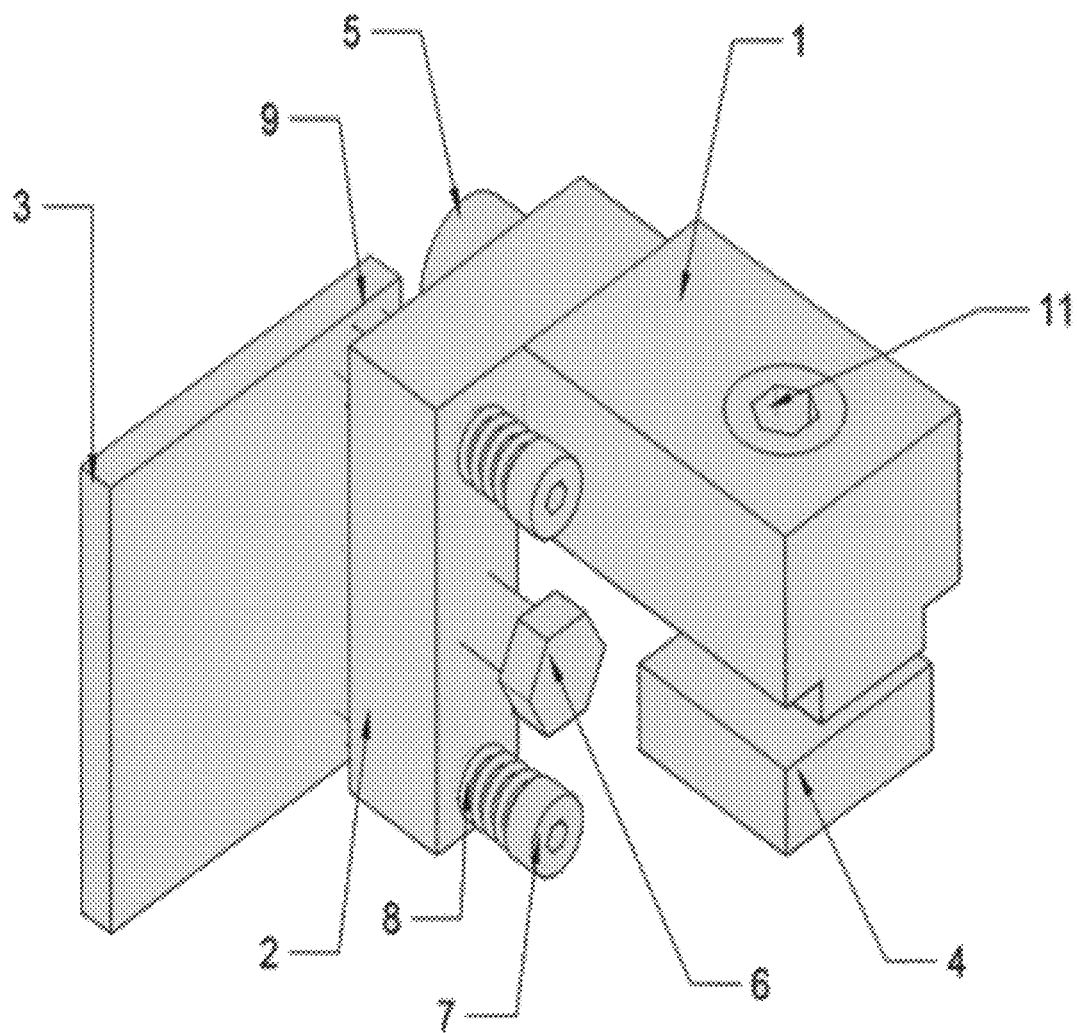

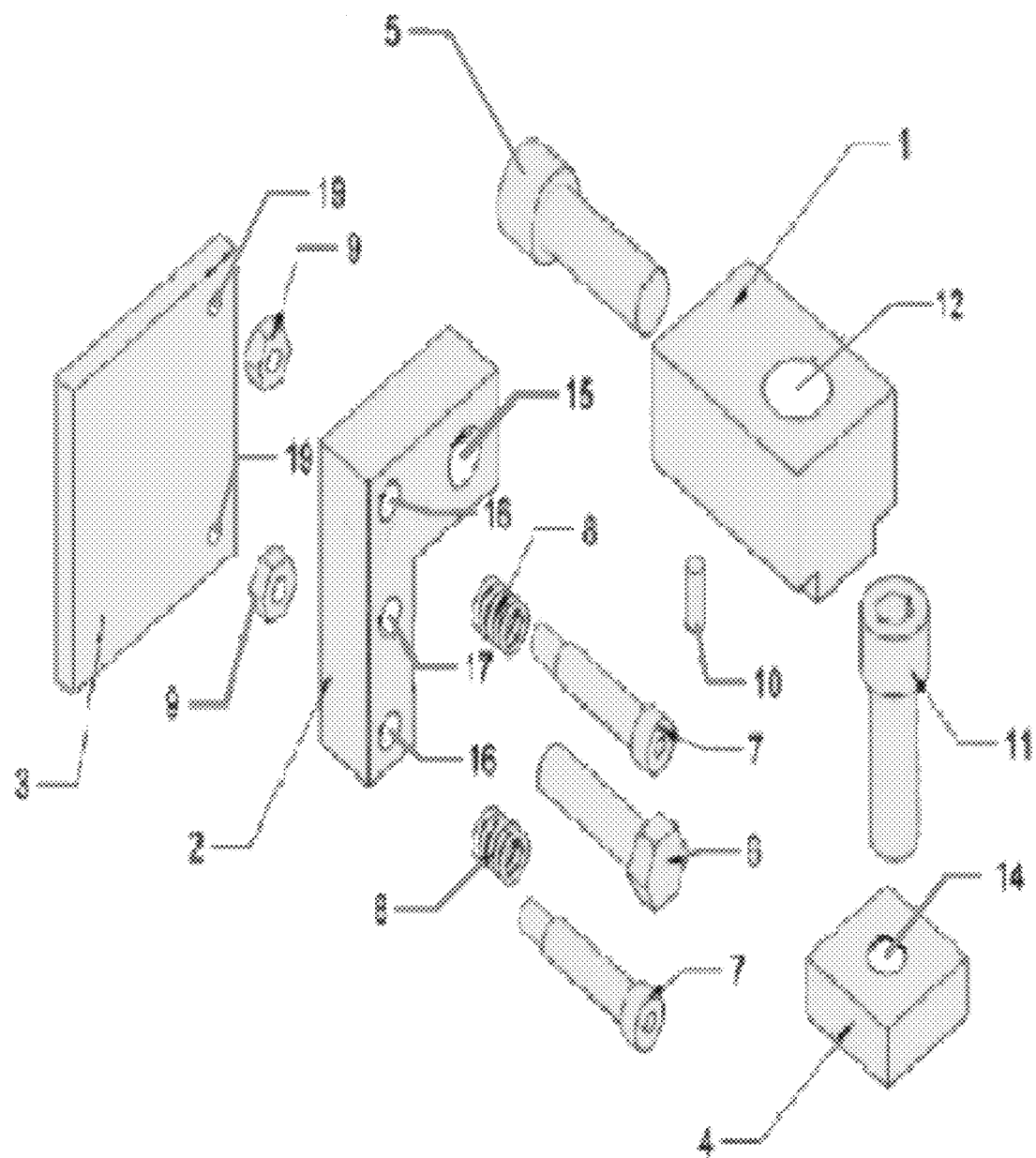

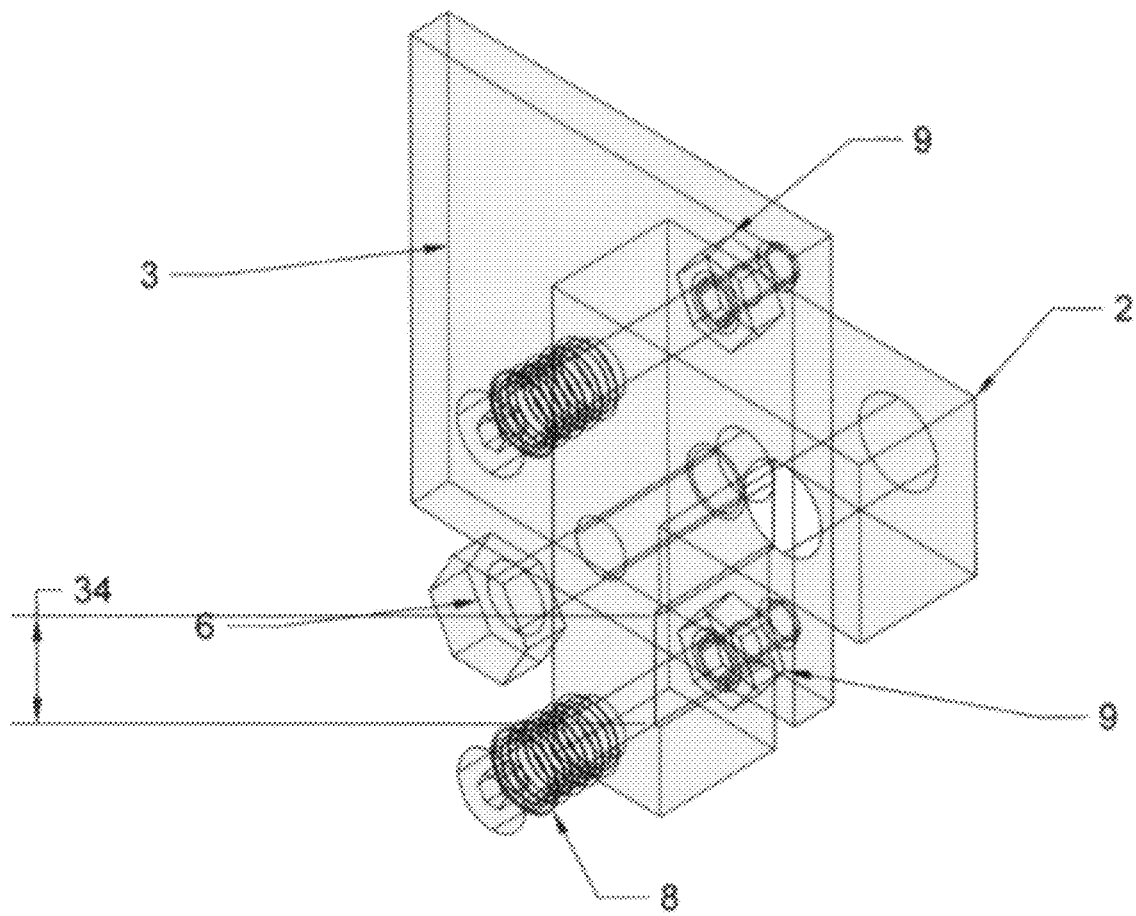

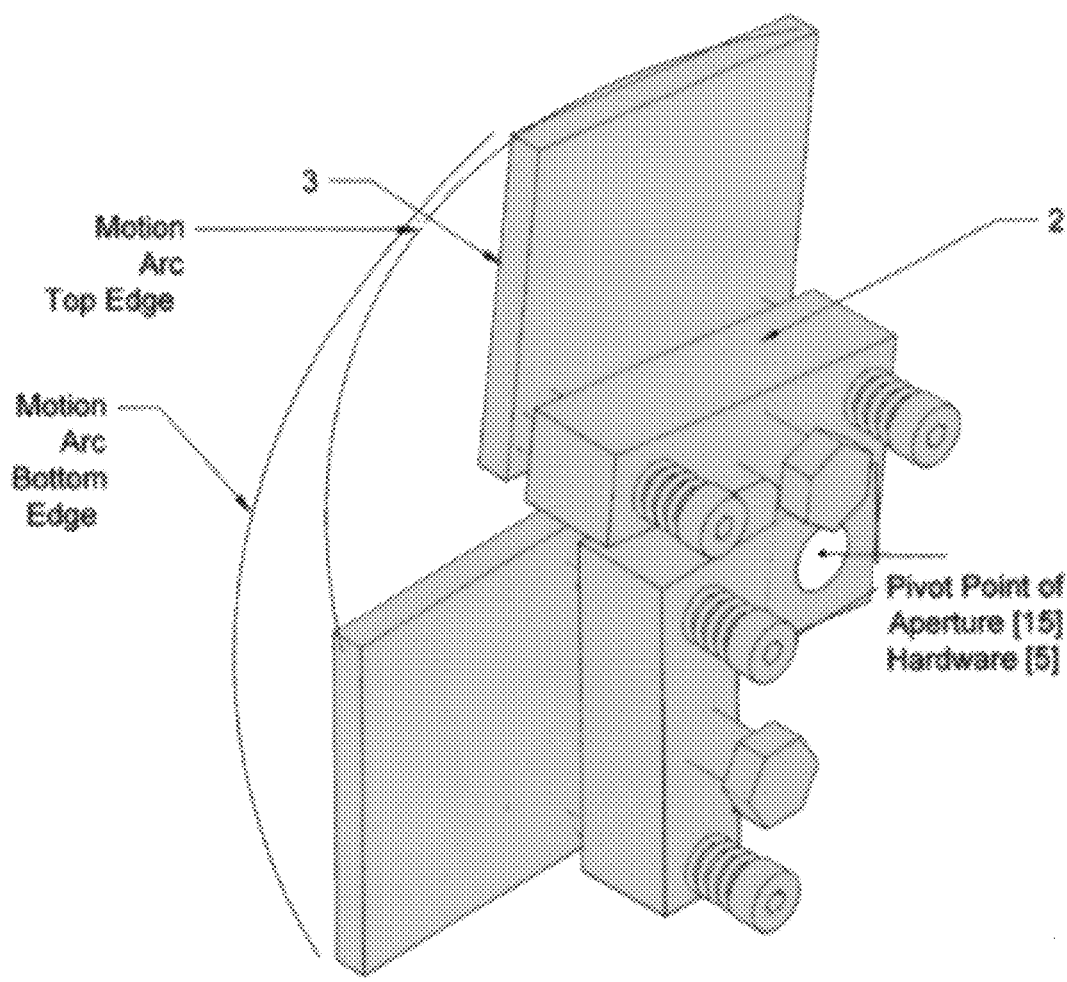

Main Body Block (Inverted)
Wireframe View

Cross Section and Segments

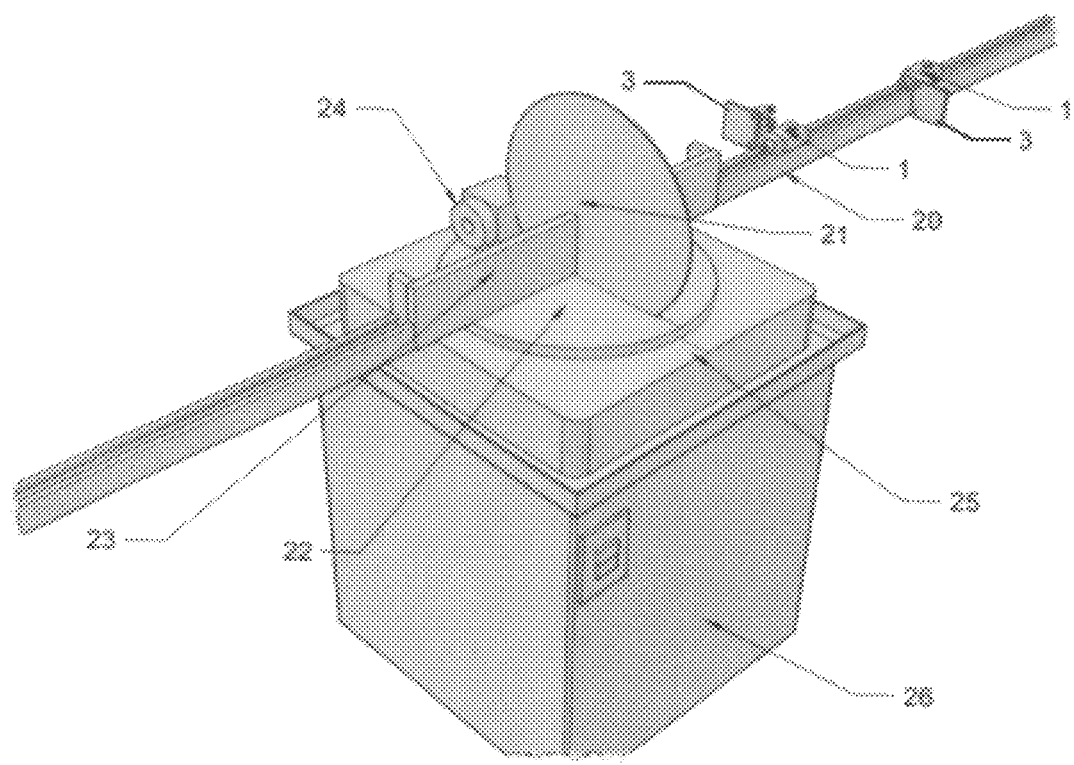

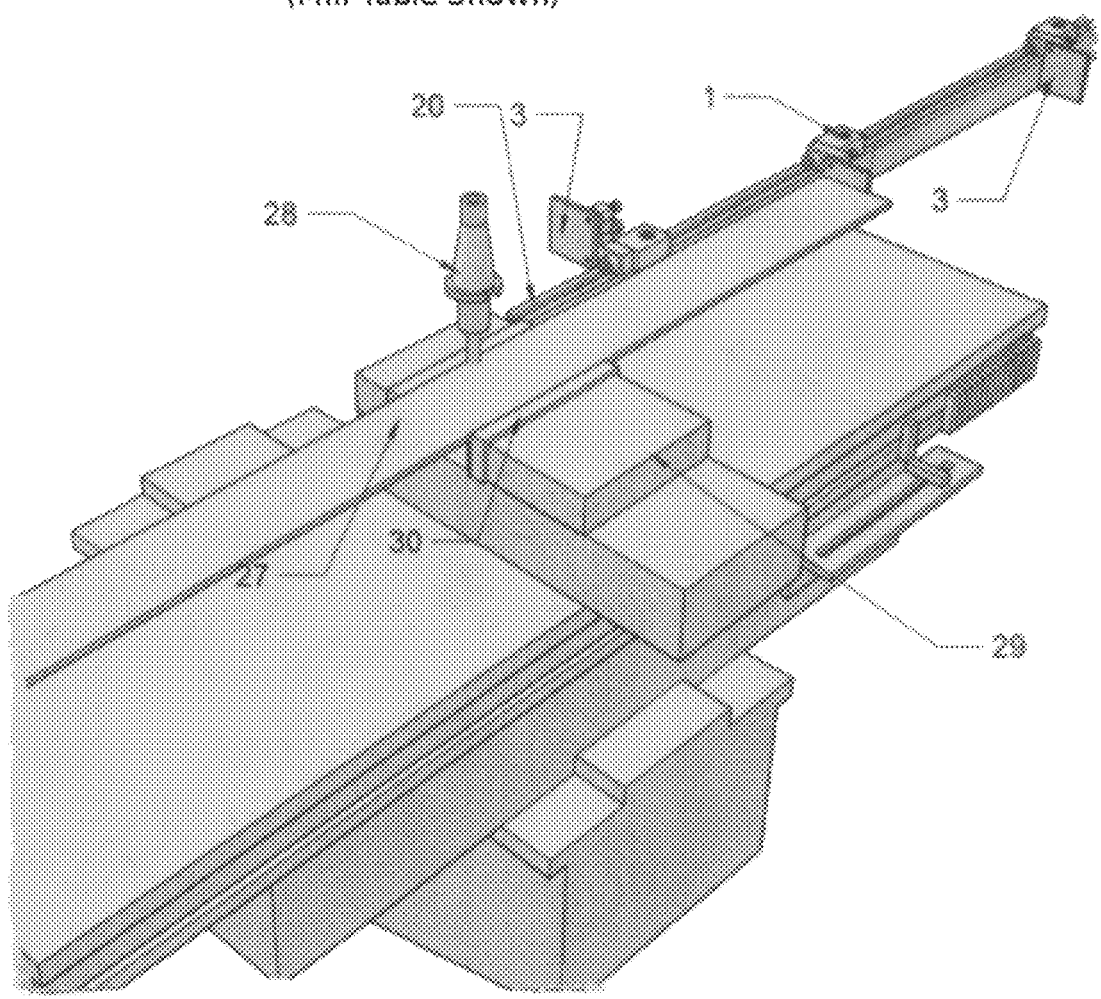

MICRO-ADJUSTABLE FLIP-AWAY WORK STOP FOR STRUT SYSTEMS

RELATED U.S. APPLICATION DATA

Provisional application No. 61/854,682 filed on Apr. 30, 2013; confirmation no. 5486 application Ser. No. 14/257, 203 371(c) Date Apr. 21, 2014; confirmation no. 2430

Prospective US Patent Classes and Subclasses

269/315, 269/318, 83/468.8, 144/253.1, 29/592, Preliminary Class: 144

Publication Classification

Prior Art Citation(s)

| U.S. Pat. 2,618,300 | November 1952 | Freudenthaler | 83/468 |
| --- | --- | --- | --- |
| U.S. Pat. 3,994,484 | November 1976 | Schorr | 269/315 |
| U.S. Pat. 4,693,158 | September 1987 | Price | 83/468 |
| U.S. Pat. 5,337,641 | August 1994 | Duginske | 83/468 |
| U.S. Pat. 7,798,187 | September 2010 | Duginske | 144/253.1 |

Relevant Citation(s)

| U.S. Pat. 2,345,650 A | April 1944 | Attwood | 248/244 |
| --- | --- | --- | --- |

TECHNICAL FIELD OF THE INVENTION

This invention relates to jigs and fixtures for the purposes of positioning and repositioning a work-piece in woodworking and metalworking applications—specifically concerning assemblies commonly referred to as work-stops. This invention principally applies to the use of radial chop saws, though there are legitimate applications in milling, routing, and other similar activities.

BACKGROUND OF THE INVENTION

Prior Art Published by the Inventor

Custom Fabricating Solutions. "Micro-Adjustable Flip-Away Strut Stop." Online video clip. Youtube. Youtube, 12 Feb. 2014. Web. 14 Apr. 2014.
Custom Fabricating Solutions. "Flip Stop 2." Online video clip. Youtube. Youtube, 12 Feb. 2014. Web. 14 Apr. 2014.
Custom Fabricating Solutions. "Flip Stop, End User Model." Online video clip. Youtube. Youtube, 12 Feb. 2014. Web. 14 Apr. 2014.
"Micro-Adjustable Flip-Away Strut Stop." Custom Fabricating Solutions. Weebly, n.d. Web. 18 Apr. 2014. <http://www.customfabricatingsolutions.com/micro-adjustable-flip-away-strut-stop.html>.
"One Micro-Adjustable Flip-Away Strut Stop for Unistrut or Similar Rail System." eBay. N.p., n.d. Web. 14 Apr. 2014.

Technical Problem—Brief

The woodworking and metalworking industries utilize cutting stations—equipment which often is comprised of a rotating saw blade that is moved or moves in relation to a work-piece in order to cut or grind material—that often use jigs in order to enhance the effectiveness of these cutting stations. In particular, jigs that are meant to act as contact boundaries for material that is to be cut—henceforth referred to as work-stops—are employed to correctly position material meant for modification activities, such as cutting, shaping, paring, scoring, and grinding. The market does not supply a strut-channel based work-stop for cutting stations that is equally suited for metalworking and woodworking applications while remaining pragmatic, economical, and modifiable for the contemporary operator.

Technical Problem—Detailed

Channel-based work-stop assemblies can be characterized as work-stops which use a rail or track system to allow for proper alignment and mobility of the work-stop in relation to the modifying instrument, for things like cutting or shaping equipment or tools, and can be classified into three principal types: flip-away, indexable or index-based, and hybrid-style work-stops. Flip-away systems are able to be temporarily removed from the material work-piece plane, which is often accomplished through a flipping movement of axial rotation away from the material work-piece plane (see U.S. Pat. No. 7,798,187 B1). Flip-away systems allow for quick and easy operation, but are often criticized for imprecision and can suffer from excessive pliability. Indexable systems (see U.S. Pat. No. 3,994,484 A or U.S. Pat. No. 2,618,300 A) are able to be indexed to specific coordinates. Indexable systems are often rigid and remain consistent through multiple cutting operations, but their design forces them to remain in the material work-piece plane for as long as a coordinate is to be kept. Hybrid-style work-stops (see U.S. Pat. No. 5,337,641) employ elements of the previous work-stop types in order to benefit from the advantages of both. Unfortunately, many hybrid-style stops also propagate the drawbacks of the aforementioned work-stop types: without employing impedimenta, most channel-based work-stops can offer speed, precision, or a compromise between the two. Those few hybrid-style stops that claim to offer both factors without adding superfluous actions or mechanical complications are expensive or complex.

The Invention as a Solution to the Technical Problem

The invention improves upon existing hybrid-style work-stops and jigs by employing a basic, yet novel design which affords more than a compromise between speed and precision. Illustrations and explanations herein will detail how the invention employs the desirable features of aforementioned channel-based flip-away and indexable work-stop types, while minimizing the drawbacks of these. Furthermore, the invention supports this claim through a system design that need be neither prohibitively expensive nor overly convoluted, and can be readily modified in order to comply with different specifications. These and advantages of the invention will be apparent from the forthcoming description and drawings.

SUMMARY OF THE INVENTION

Brief Description of the Present Invention and its Use

Note: The inventor requests that the patent application be not limited to the dimensions given hereafter; any specific dimensions of certain items are included in order to assist with the understanding of the present invention and the edification of the patent application. It is impractical to establish a single standard for all cutting stations, as requirements may vary widely from station to station; indeed, this fact is one of the reasons for the present invention's design in the first place. It is for these reasons that while some specific attributes are given in the following descriptions and parts list, some items are not specifically sized.

The preferred embodiment of the present invention is an assembly that attaches to a Strut Channel [20] made from strut channel (see U.S. Pat. No. 2,345,650 A) and works in conjunction with said Strut Channel [20] to comprise a work-stop. After the work-stop is installed on the Strut Channel [20], the operator can tighten the vertical ½-13× 1½" Socket Head Bolt [11] in order to clamp the work-stop in place. The operator can then un-clamp and re-clamp the assembly wherever he or she chooses by loosening and tightening the ½-13×1½" Socket Head Bolt [11] in order to provide or remove a semi-permanent table boundary at the Stop Block [3]. In the case of radial arm saws, for example, this boundary serves to determine the length of a piece of cut material, and can be used to repeatedly produce similar cut lengths. If the operator wishes to drastically alter the length at which a piece will be cut, he or she can loosen the ½-13×1½" Socket Head Bolt [11] and reposition the entire assembly before re-tightening. If the operator wishes to minutely alter the length at which a piece will be cut, he or she can adjust the ⅜-16×1½" Adjustment Hex Head Bolt [6] to index the Stop Block [3] into the desired cutting coordinate. After cutting, the operator can then flip the Stop Arm [2] and Stop Block [3] around the pivot point of the ½-13×1½" Socket Head Bolt [5] in order to vacate the work-stop from the work-piece plane, which is the space that extends from the Saw Table Surface [22] and the Saw Fence [23] surfaces that accommodates the material to be cut. When the work-piece plane is made vacant in this manner, an operator can use the Saw Table Surface [22] with impunity, yet will be able to reacquire the previously dialed-in cut coordinate simply through rotating the Stop Arm [2] and Stop Block [3] back into the work-piece plane.

List of the Components of the Present Invention

Machined Pieces

| | |
|---|---|
| 1 | Main Body |
| 2 | Stop Arm |
| 3 | Stop Block |
| 4 | T-Nut |

Hardware

| | |
|---|---|
| 5 | ½-13 × 1½" Socket Head Bolt |
| 6 | ⅜-16 × 1½" Adjustment Hex Head Bolt |
| 7 | 5/16 × 1½" Shoulder Bolt |
| 8 | Return Springs |
| 9 | Jam Nut |
| 10 | 10-32 ½" Long Set Screw |
| 11 | ½-13 × 1½" Socket Head Bolt |

Apertures

| | |
|---|---|
| 12 | ½" Hole Counter Bored for a ½-13 Socket Head Bolt |
| 13 | .4375" Outer Diameter Body Blind Hole Drilled 1 Inch Deep and Tapped ½-13 to ¾" Deep |
| 14 | .4375" Outer Diameter T-Nut Through Hole Tapped ½-13 |
| 15 | .5" Outer Diameter Through Hole |
| 16 | .3125" Outer Diameter Shoulder Bolt Through Hole |
| 17 | .3230" Outer Diameter Adjuster Bolt Through Hole Tapped at ⅜-16 |
| 18 | .1719" Outer Diameter Set Screw Intersecting Hole |
| 19 | .2031" Outer Diameter Stop Block Through Hole Tapped at ¼-20 |
| 34 | Scale Gap/Ruler Space |
| 35 | Side Milling in Main Body |

Accompanying Pieces (Those not Expressly Included in the Present Invention)

| | |
|---|---|
| 20 | Strut Channel |
| 21 | Saw Blade |
| 22 | Saw Table Surface |
| 23 | Saw Fence |
| 24 | Saw Blade Pivot Point |
| 25 | Saw Base |
| 26 | Saw Base Cabinet, |
| 27 | Material or Work-Piece |
| 28 | Other Cutting Agent |
| 29 | Vise |
| 30 | Clamping Surface |
| 31 | Strut Bead |
| 32 | Strut Bead Gap |
| 33 | Strut Channel Gap/T-Nut Space |

DESCRIPTION OF THE DRAWINGS

FIG. 1 is an isometric view of an assembly of the present invention in a right-of-blade orientation without the strut channel.

FIG. 2 is an isometric exploded view of the present invention in the right-of-blade orientation, better showing the hardware and makeup of the assembly than the completed assembly.

FIG. 3A is a wire-frame model of the Stop Arm [2], the Stop Block [3] and all pertinent hardware, meant to better show the apertures and hardware necessary for the indexing operation. This image also shows the Scale Gap/Ruler Space [34], meant to accommodate a scale or tape measure that might already be present on a cutting station.

FIG. 3B is a hypothetical representation of the flip-away action: the image shows a Stop Arm [2] and Stop Block [3] in the "up" orientation superimposed atop the same Stop Arm [2] and Stop Block [3] in the "down" orientation. The curves represent the path that the Stop Block [3] will take during the flipping action.

Figure 4:
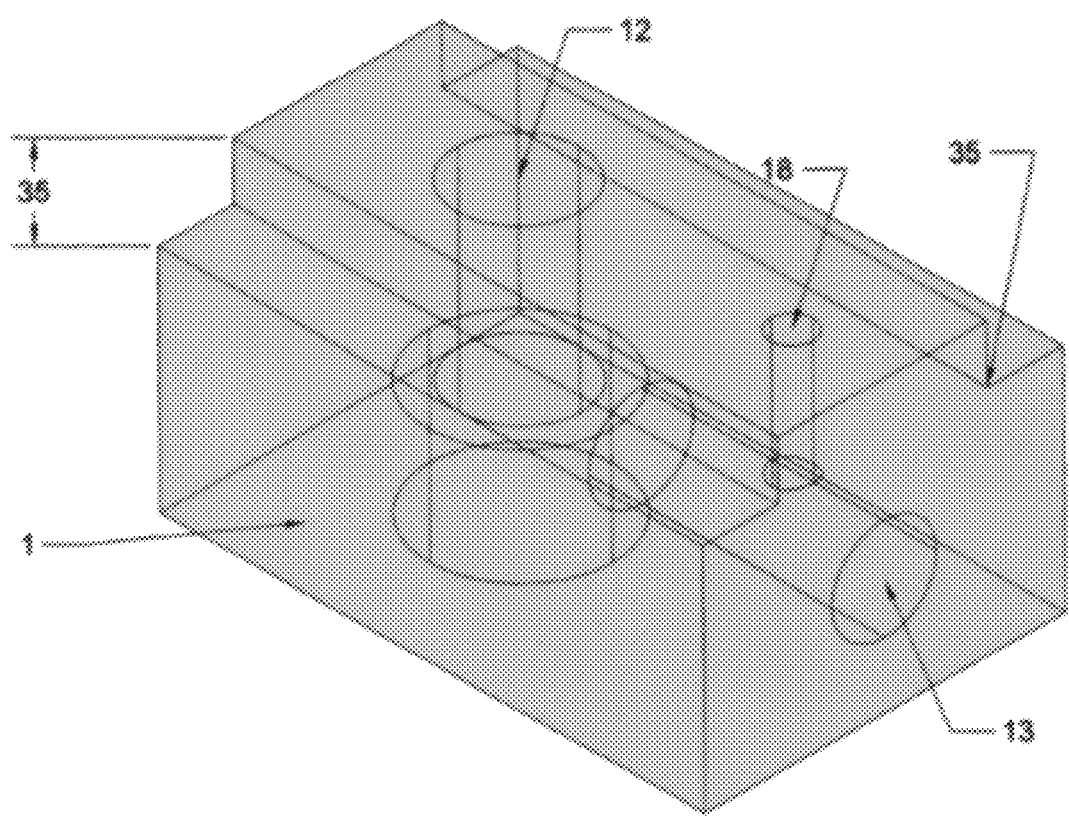
FIG. 4 is an inverted isometric view of the Main Body [1] showing all apertures not clearly visible in FIG. 1 and FIG. 2, specifically the 0.4375" Outer Diameter Blind Hole Drilled 1 Inch Deep and Tapped ½-13 to ¾" Deep [13] and the Set Screw Intersecting Hole [18], as well as the bottom of the Main Body [1] which is Side Milled [35] in order to fit into the Strut Bead Gap [32] of the Strut Channel [20] in FIG. 5.

at a 12 o'clock position in relation to the Saw Table Surface [22]. An alternate embodiment may consist of a Strut Channel [20] that—from the perspective of the Strut Bead [31]—is rotated 90° towards the work-piece plane.

FIG. 6 is an isometric view of an entire cutting station from the opposite relative perspective used in FIGS. 1, 2, 3A, and 3B. This figure shows multiple iterations of the preferred embodiment of the present invention installed along the Strut Channel [20].

FIG. 7 is an isometric view from the same perspective as FIG. 6, but for an Other Cutting Agent [28]. A milling setup is shown, though the Other Cutting Agent [28] can be representative of other cutting or shaping implements. This figure also shows a Vise [29] and Clamping Surface [30] that serve to show how a Material or Work-Piece [27] may actually be handled in radial arm saw tables and other cutting stations.

DESCRIPTION OF THE EMBODIMENTS

The embodiments of the present invention in which an exclusive property or privilege is claimed are defined as follows:

The preferred embodiment of the present invention consists of four principal parts: the T-Nut [4] is designed to reside in the Strut Channel Gap/T-Nut Space [33] of a Strut Channel [20] which is in the "channel-up" orientation as in FIG. 6 and FIG. 7, which contributes to the clamping action that secures the assembly, FIG. 1, to the Strut Channel [20]; the Main Body [1] which interacts with the T-Nut [4] to finish the aforementioned clamping action which allows for a ½-13×1½" Socket Head Bolt [5] to act as the pivot point around which subsequent parts of the assembly rotate; the Stop Arm [2] is an arm in the shape of a capital "L" and is anchored at the end of one "leg" of the "L" and can be axially rotated towards or away from the work-piece plane around the Main Body [1] pivot point—specifically, a 0.5" Outer Diameter Through Hole [15] in the Stop Arm [2] allows for the rotation of the entire Stop Arm [2] around the aforementioned ½-13×1½" Socket Head Bolt [5] at the pivot point—in order to remove or replace the work-stop surface from the Material or Work-Piece [27] plane. The Stop Block [3] serves to contact the work-piece and is able to be indexed towards or away from the Stop Arm [2]—and by extension reduce or increase its relative distance to an Other Cutting Agent [21].

Seven pieces of hardware and corresponding apertures that are cut into the four principal parts of the preferred embodiment comprise an assembly which is designed to complement an x-coordinate Saw Fence [23] extension, which is made of Strut Channel [20], for use with power equipment—such as but not limited to Radial Chop Saws [21]—or other tools that shape and modify a work-piece. The present invention is clamped to the Strut Channel [20] through a tightening rotation of the vertically aligned ½-13×1½" Socket Head Bolt [11] which serves to fasten the assembly to the Strut Channel [20] by drawing one block—the T-Nut [4]—upward, and another block—the main body Main Body [1]—downward onto the Strut Bead [31] in the following manner: the ½-13×1½" Socket Head Bolt [11] is a partially-threaded metal bar that is inserted into and through the Main Body [1] through a ½" Hole Counter Bored for a ½-13 Socket Head Bolt [12] and is turned in the clockwise direction when in contact with the threads of the tapped. 4375" Outer Diameter T-Nut Through Hole Tapped at ½-13 [14] in order to draw the T-Nut [4] upward as the ½-13×1½" Socket Head Bolt [11] applies pressure downward on the Main Body [1].

The Stop Arm [2] is comprised of four apertures: the 0.5" Outer Diameter Through Hole [15] is meant to allow for the flip-away action, while the two 0.3125" Outer Diameter Shoulder Bolt Through Holes [16] and one 0.3230" Outer Diameter Adjuster Bolt Through Hole Tapped at ⅜-16 [17] allow for the indexing action. In regards to the flip-away action, the Stop Arm [2] is affixed to the Main Body [1] by means of a ½-13×1½" Socket Head Bolt [5] which is fit through a 0.5" Outer Diameter Through Hole [15] in the Stop Arm [2] and is tightened through the interaction of the ½-13×1½" Socket Head Bolt's [5] threads and the and the 0.4375" Outer Diameter Blind Hole Drilled 1 Inch Deep and Tapped ½-13 to ¾" Deep [13] within the Main Body [1]. Before the present invention is installed in a Strut Channel [20], but after an acceptable level of tightness—clamping strength—has been established between the Stop Arm [2] and the Main Body [1], a 10-32½" Long Set Screw [10] may be tightened into the 0.1719" Outer Diameter Set Screw Intersecting Hole [18] until the 10-32½" Long Set Screw [10] makes contact with the ½-13×1½" Socket Head Bolt [5]. The installation of a 10-32½" Long Set Screw [10] lets the flip-away resistance be set to a level that is tight enough to keep cutting coordinate tolerance, but loose enough to allow for uninhibited operation. The 10-32½" Long Set Screw [10] is not a necessary component in the scope of the present invention, though important if the assembly is to keep precise tolerances for an extended period of use.

In regards to indexing actions of the preferred embodiment, there are two 0.3125" Outer Diameter Shoulder Bolt Through Holes [16] that each accommodate one ⁵⁄₁₆×1¼" Shoulder Bolt [7] and one 0.3230" Outer Diameter Adjuster Bolt Through Hole Tapped at ⅜-16 [17] that accommodates a ⅜-16×1½" Adjustment Hex Head Bolt [6]. The two ⁵⁄₁₆×1¼" Shoulder Bolts [7] are both first inserted through Return Springs [8] and through the Stop Arm [2] at the 3125" Outer Diameter Shoulder Bolt Through Holes [16] and then are threaded through a Jam Nut [9] before they are threaded into the Stop Block [3] at one of two 0.2031" Outer Diameter Stop Block Through Hole Tapped at ¼-20 [19]. In the preferred embodiment, the Jam Nuts [9] that are on the ⁵⁄₁₆×1¼" Shoulder Bolts [7] are then tightened against the Stop Block [3], securing the connection of the Stop Block [3] to the Stop Arm [2] by clamping the connection of the ⁵⁄₁₆×1¼" Shoulder Bolts [7] and the 0.2031" Outer Diameter Stop Block Through Holes Tapped at ¼-20 [19]. In addition to securing the Stop Block [3], these ⁵⁄₁₆×1¼" Shoulder Bolts [7] traverse within and are aligned by the 0.3125" Outer Diameter Shoulder Bolt Through Holes [16] of the Stop Arm [2] in order to keep the work-stop surface of the Stop Block [3] square with the Stop Arm [2] and by extension, square with the Strut Channel [20] and the Saw Blade [21] or Other Cutting Agent [28]. In the preferred embodiment, the Return Springs [8] that are penetrated by the ⁵⁄₁₆×1¼" Shoulder Bolts [7] provide constant pressure between the Stop Arm [2] and the ⁵⁄₁₆×1¼" Shoulder Bolts [7], which serves to reduce backlash. The 3230" Outer Diameter Adjuster Bolt Through Hole Tapped at ⅜-16 [17] and the ⅜-16×1½" Adjustment Hex Head Bolt [6] that allow for the indexing of the Stop Block [3] along the x-axis are located between the ⁵⁄₁₆×1¼" Shoulder Bolts [7] and 0.3125" Outer Diameter Shoulder Bolt Through Holes [16]. While other work-stops include adjustment capabilities, the preferred embodiment sets the indexing apparatus in line with that which is to be adjusted—the work-piece itself—so as to minimize the possibility of flexion and deflection whenever force is applied, therefore minimizing the threat of throwing the entire assembly out of true. When the ⅜-16×1½" Adjustment Hex Head Bolt [6] is threaded through the 0.3230" Outer Diameter Adjuster Bolt Through Hole Tapped at ⅜-16 [17] and makes contact with the Stop Block [3], this creates a new "zero" for the work-stop surface of the Stop Block [3]. This "zero" acts as a point from which minute adjustments can be made, according to the precise cutting coordinates that are necessary. The ⅜-16×1½" Adjustment Hex Head Bolt [6] has a ⅜-16 thread pattern, and is installed into a corresponding 0.3230" Outer Diameter Adjuster Bolt Through Hole Tapped at ⅜-16 [17]. Those familiar with the industry will know that a ⅜-16 thread pattern refers to a ⅜" diameter bolt with 16 threads per inch. When in a nut or tapped hole with that same thread pattern, it will travel one inch for every sixteen 360° revolutions.

Example of Use within the Preferred Embodiment

While operators may elect to alter their procedural steps within reason, a typical cutting activity—while using the present invention on a typical cutting station as seen in FIG. 6 and FIG. 7—may occur in the following hypothetical manner:

An operator stands before a radial arm saw cutting station, such as in FIG. 6, that is equipped with a Saw Fence [20] which has multiple assemblies of the preferred embodiment of the present invention already installed on both the right-of-blade and left-of-blade Strut Channel [20]. These assemblies are already in the "up" orientation—that is, the Stop Arm [2] and Stop Block [3] have been axially rotated out of the work-piece plane. The operator has been instructed to cut a length of 2" by 2" aluminum tubing that is between 11.975" and 12.025" in length. Knowing that Other Cutting Agents [28] and Saw Blades [21] have inherent variances, the operator accommodates for these variances by taking a tape measure, or other measuring device, and measures 12.0625" of total space between the Saw Blade [21] and the desired work-stop position to the right of the Saw Blade [21]. The operator flips a the work-stop that is near the 12.0625" measurement into the "down" orientation, and loosens the vertical ½-13×1½" Socket Head Bolt [11] on that assembly. The operator moves the entire assembly until the work-stop surface of the Stop Block [3] is on the 12.0625" line of the tape measure or scale—12.0625" from the Saw Blade [21]. The operator clamps the material securely into place on the Saw Table Surface [22]. The operator then activates the saw and brings the Saw Blade [21] down onto the material enough to make a nick in the material at the furthest dimension of the cut path before raising the Saw Blade [21] and deactivating the saw. In this example, through use of a tape measure or caliper, the operator finds that this cut results in a total material cut length of 12.0325", outside of acceptable tolerance. In order to properly size the piece, the operator unclamps the material from the Saw Table Surface [22] and rotates the ⅜-16×1½" Adjustment Hex Head Bolt [6] clockwise one half-turn—presenting three new bolt faces of the ⅜-16×1½" Adjustment Hex Head Bolt [6] in the clockwise direction: moving the work-stop ~0.0313" toward the Saw Blade [21] and therefore lessening the total length of the piece by ~0.0313". The operator re-clamps the aluminum material to the Saw Table Surface [22] before activating the Saw Blade [21] and cutting the piece. After the piece is cut, the operator deactivates and places the Saw Blade [21] into the return position, and then removes the cut material from the Saw Table Surface [22], Finally, the operator checks the length of the cut material with a tape measure or caliper, finding that the total cut length is 12.001" and within allowable tolerances. The operator finishes his operation by flipping the Stop Arm [2] and Stop Block [3] out of the materiel work-piece plane in order to preserve this accepted cutting coordinate, and to maintain the option of using it again.

Individuals that are familiar with the industry know that blade-binding may occur while cutting certain material at certain thicknesses when work-stops are left in place while cutting, if a cutting station does not provide material clamping on the same side of the blade as the work-stop. The present invention can be removed after clamping—and therefore eliminate the opportunity for blade-binding—the current scenario reduces the chance of blade-binding.

Advantageous Effects of the Present Invention

Figures 5A, 5B, 5C:
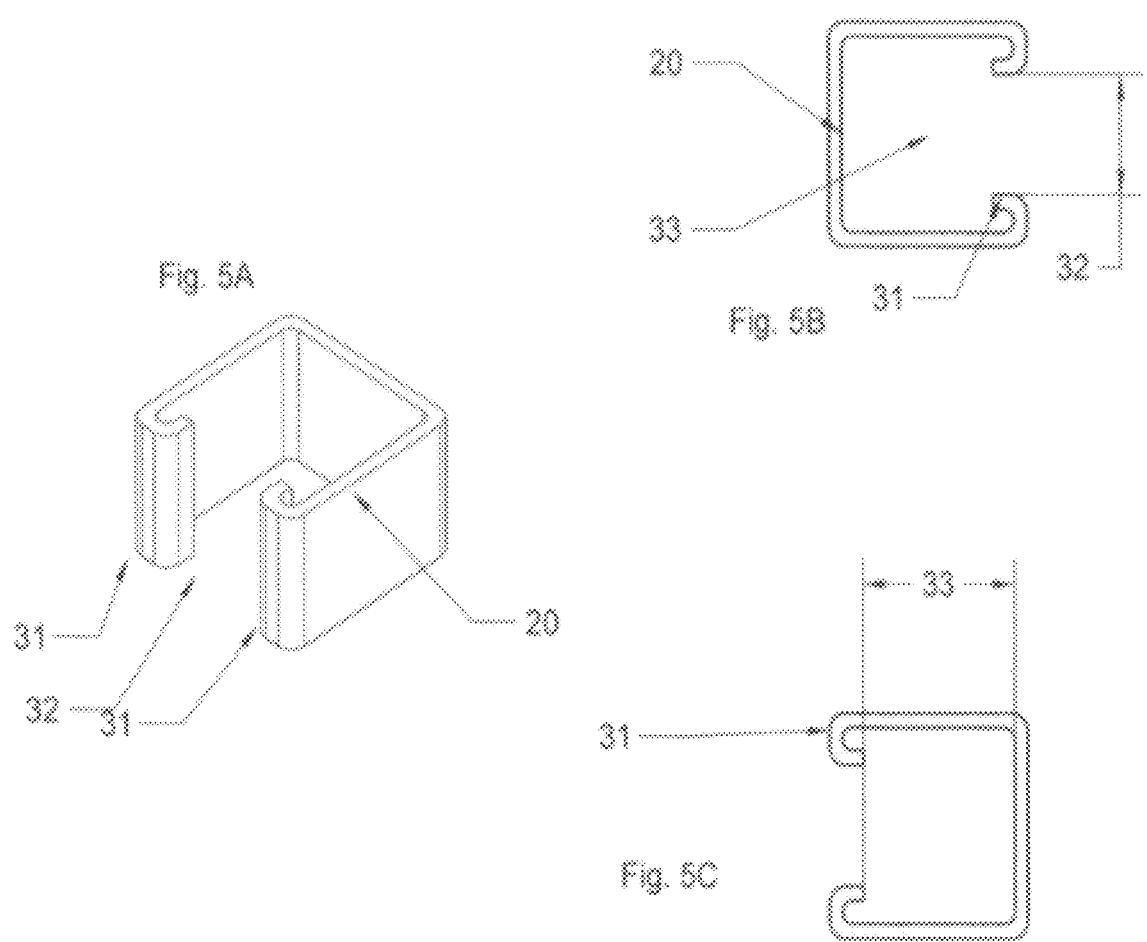
FIG. 5A is a segment of Strut Channel [20] in an isometric view.
FIG. 5B and FIG. 5C are mirrored cross-sections of a Strut Channel [20]. Note that in the preferred embodiment, the Strut Channel [20] for a Saw Fence [23] extension—see FIG. 6 and FIG. 7—will be attached to a Saw Table Surface [22] in a way that places the Strut Bead [31]

1. The preferred embodiment can be used in various existing systems. Many cutting stations currently use Strut Channels [20] (see U.S. Pat. No. 2,345,650 A) as a fence extender. The preferred embodiment is used with "solid channel," see FIG. 5A, but alternate embodiments may use punched channel, half-slotted channel, slotted channel, half-channel strut and others provided that the Main Body [1], T-Nut [4], and vertical ½-13×1½" Socket Head Bolt [11] are properly sized. The preferred embodiment includes a Side Milling in Main Body [35], see FIG. 4, that serves to fit inside the Strut Bead [31] of the Strut Rail [20].
    1.a. In conjunction with point 1, the preferred embodiment uses a T-Nut [4] that is small enough to fit in the Strut Channel Gap/T-Nut Space [33] but large enough to properly contact the walls of the Strut Channel [20]; the Main Body [1] has the Side Milling in Main Body [35] small enough to employ the Strut Bead [31] a track, but large enough to stay properly aligned within the track.
    1.b. In conjunction with point 1.a, this T-Nut [4] is small enough in one dimension to be dropped through the Strut Bead [31] into the Strut Channel Gap/T-Nut Space [33] from the top of the Strut Channel [20], so operators need not remove existing stops in order to install another work-stop.
    1.c. The preferred embodiment has a Scale Gap/Ruler Space [34] that can accommodate a scale placed on the Strut Channel [20]. The present patent application does not include the scale, nor does it expressly suggest installing a permanent scale on a fence extension. Nevertheless, the preferred embodiment includes such a Scale Gap/Ruler Space [34] in case the operator does desire to use said scale.
2. The simplicity and strength of the preferred embodiment results in rigidity of the system by reducing the pliability that would be present in systems with multiple moving pieces, or extended distances between a secure point and the point at which the work-piece contacts the work-stop. This rigidity allows the system to be used in metalworking, while the rapidity, fluidity, and ease of operation allows the system to be employed in woodworking.
    2.a. In conjunction with point 2, the preferred embodiment of the present invention has the location of the ⅜-16×1½" Adjustment Hex Head Bolt [6] within the Stop Arm [2] between the 5/16×1¼" Shoulder Bolts [7], which serve to strengthen and align the indexing action of the system. This entire system is maneuvered into the work-piece plane by the Stop Arm [2], which aligns the force of the indexing action in line with the work-piece itself. These two factors limit the exertion of out-of-line force on the rest of the assembly, and therefore reduce the amount of flex in the system.
3. The preferred embodiment clamps to the Strut Bead [31] of the Strut Channel [20] with a single tightening action of the vertical ½-13×1½" Socket Head Bolt [11] that goes through the Main Body [1] and the T-Nut [4]. Thus, the entire assembly can be un-clamped, moved along the Strut Rail [20], and re-clamped by loosening and tightening a ½-13×1½" Socket Head Bolt [11].

4. The Return Springs [8] of the preferred embodiment exert constant pressure on both the Stop Arm [2] and the 5/16×1¼" Shoulder Bolts [7] that contact the Stop Block [3]; this said pressure works to counteract the existence of backlash, the term used to describe the inherent recoil or play which occurs in mechanical systems. This constant pressure also largely reduces the chance of having debris fall into the path of the ⅜-16×1½" Adjustment Hex Head Bolt [6] and compromise the fidelity of the indexing system.

5. Using the multiple iterations of the preferred embodiment allows an operator to have a set of work-stops that can be used in concert. Those familiar with the industry know that when cutting material at multiple cutting coordinates it is customary to cut the longest pieces first, the second-longest pieces second, and so on until the smallest length is the last coordinate cut. By using the present invention, a single operator can set stops at each cutting coordinate before cutting the various lengths in the correct order. With multiple indexable stops which do not flip out of the way, an operator would only be able to set all coordinates before cutting all pieces if the order is reversed—the operator would have to cut the smallest pieces and then remove the work-stop at the smallest cutting coordinate before he or she could use the next work-stop.

5.a. In conjunction with point 5, using multiple iterations of the preferred embodiment allows multiple operators to use a single cutting station without the need to eliminate a dialed in cutting coordinate. If an operator wishes to keep a work-stop unmolested for an extended time, he or she can demarcate the stop in some way—either with tape, ink markings, or some other marking system. This affords the preferred embodiment a "set-and-forget" feature.

6. The preferred embodiment includes the use of a ⅜-16×1½" Adjustment Hex Head Bolt [6] as the adjustment screw for the indexing action. By turning the ⅜-16×1½" Adjustment Hex Head Bolt [6] one full revolution clockwise, the ⅜-16×1½" Adjustment Hex Head Bolt [6] is drawn 0.0625" into the Stop Arm [2], and by extension moves the Stop Block [3] 0.0625"—usually towards the cutting implement, thus reducing the overall size of the piece by 0.0625". One-sixth of a turn—the equivalent of one face of the ⅜-16×1½" Adjustment Hex Head Bolt [6]—will result in a change of ~0.0104", or approximately ten thousandths of one inch. Operators can reliably adjust the cutting coordinate by as little as five thousandths of an inch by turning the ⅜-16×1½" Adjustment Hex Head Bolt [6] one twelfth of a revolution, or one half of a hex face.

Adjustment Schedule of the Preferred Embodiment (⅜-16 Hex-Head Adjustment Bolt or Screw)

| Revolutions of the Adjuster | Coordinate Change (fractional representation) | Coordinate Change (decimal representation) |
| --- | --- | --- |
| 2 revolutions (12 faces) | ⅛ inch | .125" |
| 1 revolution (6 faces) | 1/16 inch | .0625" |
| ½ revolution (3 faces) | 1/32 inch | .03125" |
| ⅙ revolution (1 face) | 1/96 inch | .01042" |
| 1/12 revolution (½ face) | 1/192 inch | .0052" |

CONCLUSION, RAMIFICATIONS, AND SCOPE

Accordingly, the reader will see that the work-stop of the preferred embodiment can be used to make minor adjustments to the Stop Block [3] known distances. The Return Springs [8] around the 5/16×1¼" Shoulder Bolts [7] maintain proper alignment of the Stop Block [3] in relation to the Stop Arm [2], while also maintaining constant contact between the Stop Block [3] and the ⅜-16×1½" Adjustment Hex Head Bolt [6]. The result of this is that even when the ⅜-16×1½" Adjustment Hex Head Bolt [6] is rotated counterclockwise to reduce the distance between the Stop Block [3] and the Stop Arm [2], the Return Springs [8] will "pull" the Stop Block [3] in conjunction with the receding ⅜-16×1½" Adjustment Hex Head Bolt [6]. When measuring the distance needed for the work-stop, for example with a tape measure, the work-stop can be locked into that position, and then the Stop Block [3] can be moved distances that account for human error, and also inaccuracies that may be present in the method of measurement. This results in easily acquired consistent, and accurate adjustments, even for tolerances less 0.010." The constant contact of the ⅜-16×1½" Adjustment Hex Head Bolt [6] against the Stop Block [3] also reduces risk of debris getting stuck in between them, which could throw off measurements.

What is claimed is:

1. A woodworking and metalworking assembly, for use as a work-stop, comprising a work-stop block, a stop arm, and a main body, wherein said work-stop block is attached to said stop arm through a system of hardware that allows manual adjustment of said work-stop block, wherein said system of hardware comprises:
   one or more adjustable fasteners attached to, and travelling through, said stop arm, which serve to exert pressure upon said work-stop block, wherein said adjustable fastener or fasteners provide means to manually adjust said work-stop block known distances relative to said stop arm through said manual adjustment;
   one or more alignment fasteners attached to said work-stop block and travelling through said stop arm, which serve to maintain rigidity and proper alignment of said work-stop block, relative to said stop arm at the distance set by said adjustable fastener or fasteners.

2. The work-slop of claim 1 wherein said stop arm is attached to said main body so that said stop arm, and by extension said work-stop block, enables axial rotation of said work-stop block into a plane of a work-piece and also axial rotation out of said plane of said work-piece.

3. The work-stop of claim 1 wherein a spring-like material around said alignment fastener or fasteners exerts constant pressure against said stop arm, and thereby against said work-stop block, and thereby against said adjustable fastener or fasteners, which serves to maintain continuous contact between said work-stop block and said adjustable fastener or fasteners during said manual adjustment.

* * * * *